United States Patent [19]

Smearing

[11] Patent Number: 4,588,779

[45] Date of Patent: May 13, 1986

[54] MODIFIED POLYETHERIMIDE RESINS

[75] Inventor: Robert W. Smearing, Pittsfield, Mass.

[73] Assignee: General Electric Company, Pittsfield, Mass.

[21] Appl. No.: 666,325

[22] Filed: Oct. 30, 1984

[51] Int. Cl.$^4$ ............................................. C08L 77/00
[52] U.S. Cl. ..................................... 525/180; 525/184
[58] Field of Search ................................. 525/180, 184

[56] References Cited

U.S. PATENT DOCUMENTS 4,390,665  6/1983  Giles, Jr. .
4,427,830  1/1984  Giles, Jr. et al. .
4,433,104  2/1984  Giles, Jr. .

Primary Examiner—John C. Bleutge
Assistant Examiner—A. L. Carrillo
Attorney, Agent, or Firm—Bernard, Rothwell & Brown

[57] ABSTRACT

The present invention relates to modified polyetherimide resins. Such resins contain high density polyethylene in an amount effective to raise the melt viscosity of the polyetherimide and reduce the tendency of the resin to stick to molds during injection molding.

9 Claims, No Drawings

MODIFIED POLYETHERIMIDE RESINS

BACKGROUND

This invention relates to a modified polyetherimide especially suitable for injection molding. Polyetherimides are unique polymers which exhibit superior strength and chemical properties, including high heat resistance, exceptional strength, and excellent processibility.

It is known that injection molded articles can be produced from polyetherimides. However, notwithstanding excellent mechanical properties, resistance to chemical attack, and processibility, delicate parts have a tendency to stick to the mold during injection molding. When these intricate parts, i.e., 10 mils, are ejected from the molds, many break. Another problem faced in the injection molding of intricate parts made from polyetherimides is the inability to fill the fine cavities of the mold.

Many injection molding resins such as polyesters, are known to stick to the molds. Generally, conventional mold release agents have been used successfully for the elimination of this problem. Such conventional mold release agents include metallic salts and esters of fatty acids, typically stearic acid. While these mold release agents have proven successful for many polymers, unfortunately they tend to decompose at the high processing temperatures used for polyetherimides.

Excellent lubricants such as silicones or Teflon ® sprays are known mold release agents. External lubricants are disadvantageous in that they introduce additional process steps in the molding operation and can cause surface contamination of the molded article.

Therefore, there exists a need for a polyetherimide resin that can be injection molded efficiently with reduced sticking to the mold.

SUMMARY OF THE INVENTION

In accordance with the present invention, a polyetherimide composition contains a polyetherimide and an effective amount of a high density polyethylene sufficient to raise the melt index of the unmodified polyetherimide. Unexpectedly, these blends are superior to unmodified polyetherimides which have a tendency to stick in the fine molds during injection molding.

DETAILED DESCRIPTION OF THE PREFERRED EMBODIMENT

The polyetherimides which are modified in accordance with the present invention are generally represented by the formula:

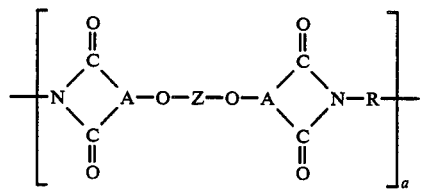

where "a" represents a whole number in excess of 1, e.g., 10 to 10,000 or more, the group —O—A< is selected from:

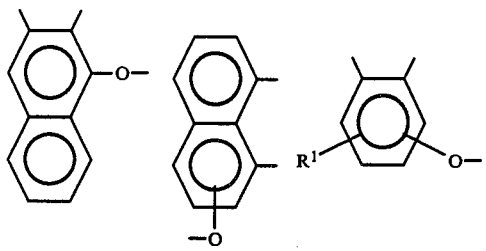

R' being hydrogen, lower alkyl or lower alkoxy. Preferably the polyetherimide includes the latter —O—A< group where R' is hydrogen such that the polyetherimide is of the formula:

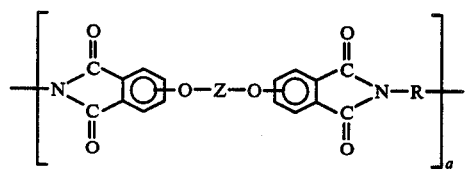

and the divalent bonds of the —O—Z—O— radical are in the 3,3', 3,4', 4,3' or the 4,4' position; Z is a member of the class consisting of (1)

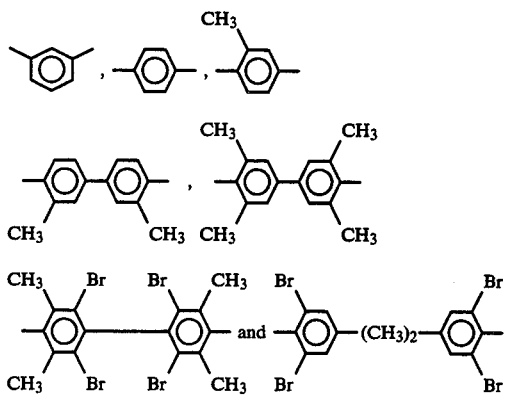

and (2) divalent organic radicals of the general formula:

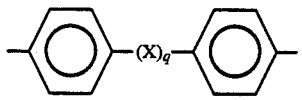

where X is a member selected from the class consisting of divalent radicals of the formulas,

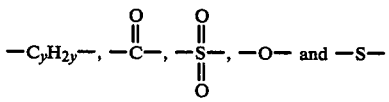

where q is 0 or 1, y is a whole number from 1 to 5, and R is a divalent organic radical selected from the class consisting of (1) aromatic hydrocarbon radicals having from 6 to about 20 carbon atoms and halogenated derivatives thereof, (2) alkylene radicals and cycloalkylene radicals having from 2 to about 20 carbon atoms, $C_{(2-8)}$ alkylene terminated polydiorganosiloxane, and (3) divalent radicals included by the formula:

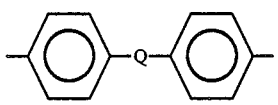

where Q is a member selected from the class consisting of:

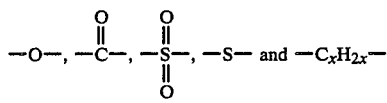

where x is a whole number from 1 to 5 inclusive. Particularly preferred polyetherimides for the purposes of the present invention include those wherein —O—A< and Z respectively are:

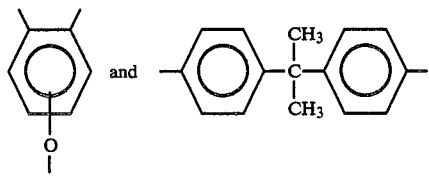

and R is selected from:

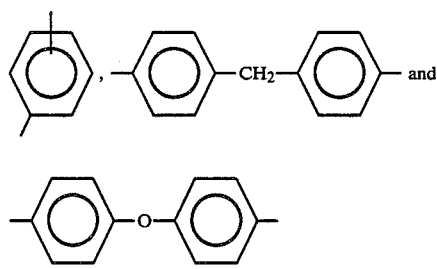

The polyetherimides wherein R is m-phenylene are most preferred.

The polyetherimides can be obtained by any of the methods well known to those skilled in the art, including the reaction of an aromatic bis(ether anhydride) of the formula:

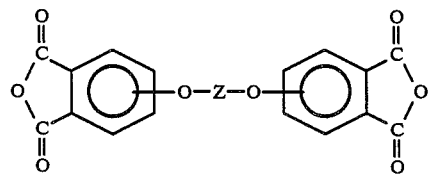

with an organic diamine of the formula:

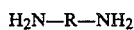

wherein Z and R are as defined hereinbefore.

Aromatic bis(ether anhydride)s of the above formula include, for example, 2,2-bis[4-(2,3-dicarboxyphenoxy)-phenyl]-propane dianhydride; 4,4'-bis(2,3-dicarboxyphenoxy)diphenyl ether dianhydride; 1,3-bis(2,3- dicarboxyphenoxy)benzene dianhydride; 4,4'-bis(2,3-dicarboxyphenoxy)diphenyl sulfide dianhydride; 1,4-bis(2,3-dicarboxyphenoxy)benzene dianhydride; 4,4'-bis(2.3-dicarboxyphenoxy)benzophenone dianhydride; 4,4'-bis(2,3-dicarboxyphenoxy)diphenyl sulfone dianhydride; 2,2-bis[4-(3,4-dicarboxyphenoxy)phenyl]propane dianhydride; 4,4'-bis(3,4-dicarboxyphenoxy)diphenyl ether dianhydride; 4,4'-dianhydride; 4,4'-bis(3,4-dicarboxyphenoxy)diphenyl sulfide dianhydride; 1,3-bis(3,4-dicarboxyphenoxy)benzene dianhydride; 1,4-bis(3,4-dicarboxyphenoxy)benzene dianhydride; 4,4'-bis(3,4-dicarboxyphenoxy)benzophenone dianhydride; 4-(2,3-dicarboxyphenoxy)-4'-(3,4-dicarboxyphenoxy)diphenyl-2,2-propane dianhydride; etc. and mixtures of such dianhydrides.

In addition, aromatic bis(ether anhydride)s also included by the above formula are shown by Koton, M. M.; Florinski, F. S.; Bessonov, M. I.; Rudakov, A. P. (Institute of Heteroorganic compounds, Academy of Science, U.S.S.R.), U.S.S.R. 257,010, Nov. 11, 1969, Appl. May 3, 1967. In addition, dianhydrides are shown by M. M. Koton, F. S. Florinski, *Zh, Org. Khin.*, 4(5), 774 (1968).

Organic diamines of the above formula include, for example, m-phenylenediamine, p-phenylenediamine, 4,4'-diamonodiphenylpropane, 4,4'-diaminodiphenylmethane, benzidine, 4,4'-diaminodiphenyl sulfide, 4,4'-diaminodiphenyl sulfone, 4,4'-diaminodiphenyl ether, 1,5-diaminohaphthalene, 3,3'-dimethylbenzidine, 3,3'-dimethoxybenzidine, 2,4-bis(β-amino-t-butyl)-toluene, bis(p-β-amino-t-butylphenyl)ether, bis(p-β-methyl-o-aminopentyl)benzene, 1,3-diamino-4-isopropylbenzene, 1,2-bis(3-aminopropoxy)-ethane, m-xylylenediamine, p-xylylenediamine, 2,4-diaminotoluene, 2,6-diaminotoluene, bis(4-aminocyclohexyl)-methane, 3-methylheptamethylenediamine, 4,4-dimethylheptamethylenediamine, 2,11-docecanediamine, 2,2-dimethylpropylenediamine, octamethyenediamine, 3-methoxyhexamethylenediamine, 2,5-dimethylhexamethylenediamine, 2,5-dimethylheptamethylenediamine, 3-methylheptamethylenediamine, 5-methylnonamethylenediamine, 1,4-cyclohexanediamine, 1,12-octadecanediamine, bis(3-aminopropyl)sulfide, N-methyl-bis(3-aminopropyl amine, hexamethylenediamine, heptamethylenediamine, nonamethylenediamine, decamethylenediamine, bis(3-aminopropyl)tetramethyldisiloxane, bis(4-aminobutyl)tetramethyldisiloxane, and the like.

Advantageously, the reactions between the dianhydrides and the diamines can be carried out employing well-known solvents, e.g., o-dichlorobenzene, m-cresol/toluene, etc. at temperatures of from about 100° C. to about 250° C. Alternatively, the polyetherimides can be prepared by melt polymerization of any of the above dianhydrides with any of the above diamine compounds while heating the mixture of ingredients at elevated temperatures with concurrent intermixing. Generally, melt polymerization temperatures between about 200° C. to 400° C. and preferably 230° C. to 300° C. can be employed. The conditions of the reaction and the proportions of ingredients can be varied widely depending on the desired molecular weight, intrinsic viscosity, and solvent resistance. In general, equimolar amounts of diamine and dianhydride are employed for high molecular weight polyetherimides, however, in certain instances, a slight molar excess (about 1 to 5 mol percent) of diamine can be employed resulting in the production of polyetherimides having terminal amine groups. Generally, useful polyetherimides have an intrinsic viscosity [η] greater than 0.2 deciliters per gram, preferably 0.35 to 0.60, or 0.7 deciliters per gram or even higher when measured in m-cresol at 25° C.

The compositions of this invention contain a polyetherimide and an amount of high density polyethylene effective to raise the melt index of the unmodified polyetherimide and reduce mold adherence during injection molding operations. Generally, the amount of polyethylene that is blended with the polyetherimide ranges from about 0.1 to about 2.5 weight percent of the total polyetherimide-polyethylene blend. Preferably, the amount of polyethylene is from about 0.1 to about 0.5.

Polyethylenes are commercially available in a variety of molecular structures. The chemical and physical properties of these polymers depend largely upon the temperatures, pressures, catalyst types, modifiers, and reactor design used in the manufacture of polyethylene. For uses in the present invention, the polyethylene should be of the high density type (hereinafter referred to as HDPE). These resins generally have a nominal density of 0.95 g/cm$^3$ or greater. High molecular weight high density polyethylene can also be used in the present invention. High molecular weight high density polyethylene is a name given to those high density polyethylene resins having a weight average molecular weight (Mw) between 300,000 and 500,000. Yet another high density polyethylene that may be used in the present invention is known as ultra high molecular weight polyethylene. Generally these resins have a molecular weight in the range of 3 million to b 6 million.

While the modified polyetherimide may contain from about 0.1 to 2.5 weight percent of polyethylene, it may be desirable to make a concentrate for subsequent blending with unmodified polyetherimide. For example, it has proven to be economical to form a modified polyetherimide masterbatch resin containing from about 10 to 15 weight percent of high density polyethylene and then blend this masterbatch with unmodified polyetherimide resin to form the final resin with from about 0.1 to about 2.5 weight percent polyethylene.

The polyethylene may be added to a granulated or pelleted polyetherimide product. The polyethylene and polyetherimide are thoroughly mixed to achieve a substantially homogeneous product with uniform improved properties. When the polyethylene is admixed with the polyetherimide in granulated form, a high degree of homogenization can be achieved if the polyethylene and polyetherimide mixture is first melted in an extrusion apparatus, vigorously mixed, and extruded with cooling of the extruded product. The extruded product is then advantageously granulated or pelleted. This operation can be carried out with conventional screw extruders.

Injection molding of articles with the modified polyetherimide of the present invention is considerably more efficient than using unmodified polyetherimides, especially for thin walled parts. This efficiency results not only from the reduction in the number of parts sticking but also from the raising of the melt index of the polyetherimide resin thus improving the melt flow of the polymer within the mold. It has also been discovered that incorporation of an effective amount of high density polyethylene decreases the injection pressure needed to fill the mold which further contributes to the efficiency of an injection molding process using the composition of the present invention.

Surprisingly, incorporation of HDPE can accomplish the desirable results without substantially adversing the physical properties of the unmodified polyetherimide. HDPE modified resins retain high distortion temperatures and high tensile and elongation properties which are required for present day uses of polyetherimides.

The following examples will serve to further illustrate the invention, but it should be understood that the invention is not restricted to these specific examples. Parts and percentages are by weight unless otherwise stated.

EXAMPLE 1-4

A series of polyetherimide-polyethylene blends was prepared, the blends molded into test specimens and the specimens tested for various properties.

The polyetherimide used to form the blends was the reaction product of essentially equimolar amounts of 2,2-bis[4-(β-3,4-dicarboxyphenoxy)phenyl] propane dianhydride and m-phenylenediamine and was produced at elevated temperatures of about 250° C. to about 300° C. under a nitrogen atmosphere. The polymer was extruded at about 300° C. to form a strand and mechanically chopped into pellets. A test specimen of the polyetherimide was injection molded from the pellets at a temperature of about 363° C.-371° C. The physical properties of the polyetherimide are set forth as Example 1 in the following Table I.

The polyethylene used in preparing the blends was a high density polyethylene resin sold and identified as Marlex HXM 50100 by Phillips Chemical Co., Bartlesville, OK.

To form the blends, the respective parts of the polyetherimide were mixed with the desired amount of the polyethylene. The mixture of the two polymers was then extruded in a Killion extruder having a barrel temperature of 316° C.-343° C. The resulting extrudate was comminuted into pellets and the pellets injection molded into test specimens in a Boy molding machine at a temperature of about 357° to 385° C.

The test specimens were then subjected to a variety of tests with the resulting data being listed below in Table I along with the weight percentage of the polyethylene that was present in the polyetherimide blend.

EXAMPLES 5-14

The basic procedures of Examples 1-4 were repeated with the exception that the polyetherimide that was used was the reaction product of essentially equimolar amounts of 2,2-bis[4-(β-3,4-dicarboxyphenoxy) phenyl] propane dianhydride and a mixture of m-phenylenediamine and p-phenylenediamine.

As in Examples 1-4, test specimens of each blend were tested for various properties. The test results for the various blends are set forth in Table II and Table III.

TABLE I

|  | Example 1 | Example 2 | Example 3 | Example 4 |
|---|---|---|---|---|
| % Polyetherimide | 100 | 99.75 | 99.50 | 99.0 |
| % HDPE | 0 | 0.25 | 0.50 | 1.00 |
| Tensile Yield[1] (psi) | 15,452 | 15,432 | 15,387 | 15,204 |

TABLE I-continued

|  | Example 1 | Example 2 | Example 3 | Example 4 |
|---|---|---|---|---|
| Elongation yield-(%) | 7.5 | 7.3 | 7.4 | 7.5 |
| Elongation, Ultimate (%) | 25.4 | 16.2 | 12.4 | 21.7 |
| Flexural modulus[2] (psi) | 460,185 | 455,311 | 460,168 | 458,281 |
| Flexural, Ultimate[2] (psi) | 21,435 | 21,231 | 20,954 | 20,914 |
| Notched Izod Impact[3] (ft lbs/in) | .95 | .61 | .83 | 1.18 |
| Rev. Notched Izod Impact-(ft lbs/in) | >16 | >16 | 15.8 | 11.0 |
| Gardner impact (lbs/in) | 300.0 | 300.0 | 84 | 46 |
| HDT[4] @ 264 psi-(°C.) | 202.2 | 200.0 | 200.2 | 200.2 |
| Spiral flow, 1/16" 389° C.-(in) | 9.5 | 10.5 | 9.5 | 10.75 |

[1]Tested according to ASTM method D-638 using a Type I bar with a 5.08 mm/min crosshead speed.
[2]Testing according to ASTM method D-790 using a 3.2 mm bar at a 1.27 mm/min crosshead speed.
[3]Tested according to ASTM method D-256.
[4]Tested according to ASTM method D-648 using a 3.2 mm bar.

TABLE II

|  | Example 5 | Example 6 | Example 7 | Example 8 |
|---|---|---|---|---|
| % Polyetherimide | 100 | 99.75 | 99.50 | 99.00 |
| % HDPE | 0 | 0.25 | 0.50 | 1.00 |
| Tensile Yield[1](psi) | 14,616 | 14,050 | 14,414 | 14,425 |
| Elongation yield-(%) | 8.8 | 8.3 | 7.8 | 7.9 |
| Elongation, ultimate (%) | 16.3 | 10.9 | 11.6 | 11.4 |
| Flexural modulus[2] (psi) | 438,073 | 448,820 | 445,070 | 440,461 |
| Flexural, ultimate[2](psi) | 19,967 | 19,967 | 19,972 | 19,979 |
| Notched Izod impact[3] (ft lbs/in) | 1.4 | — | — | — |
| Rev. Notched Izod impact (ft. lbs/in) | >16 | — | >16 | 14.5 |
| Gardner impact (in/lbs) | 202 | — | 78.6 | 164 |
| HDT[4] @ 264 psi(°C.) | 209.4 | 205 | 205.6 | 202.9 |
| Spiral flow, 1/16" 389° C.-(in) | 5.125 | 6.5 | 7.675 | 8.0 |

[1]Tested according to ASTM method D-638 using a Type I bar with a 5.08 mm/min crosshead speed.
[2]Tested according to ASTM method D-790 using a 3.2 mm bar at a 1.27 mm/min crosshead speed.
[3]Tested according to ASTM method D-256.
[4]Tested according to ASTM method D-648 using a 3.2 mm bar.

TABLE III

|  | Example 9 | Example 10 | Example 11 | Example 12 | Example 13 | Example 14 |
|---|---|---|---|---|---|---|
| % Polyetherimide | 100 | 99.9 | 99.75 | 99.5 | 9.0 | 95.0 |
| % HDPE | 0 | 0.1 | 0.25 | 0.5 | 1.0 | 5.0 |
| Elongation Yield (%) | 8.025 | 8.06 | 8.10 | 8.04 | 8.04 | 7.66 |
| Tensile Yield (psi) | 15,580 | 15,446 | 15,382 | 13,706 | 13,508 | 13,666 |
| Melt Index | 2.21 | 2.63 | 2.75 | 2.98 | 2.93 | 3.22 |

While the tendency to stick in the mold is reduced by using the modified polyetherimides of the present invention, the data above demonstrates that many physical properties of the polyetherimide are not sacrificed.

Molding properties of the high density polyethylene modified polyetherimides were determined subjectively by molding intricate test specimens (electrical connectors). Unmodified polyetherimides exhibited considerable splay, and in some cases failed to fill the mold completely. The modified polyetherimides of examples 2 and 11 were found to mold with a lower failure rate and result in far less mold sticking than was experienced with unmodified polyetherimide.

The properties characteristic of polyetherimide such as tensile strengths, elongation, high heat resistance are substantially retained by the modified polyetherimides of the present invention. This allows the modified polyetherimides to be used in existing applications of polyetherimides while providing superior processing due to the increased melt index and reduction in the tendency to stick to the mold during injection molding.

While the present invention has been described with reference to particular embodiments thereof, it will be understood that numerous modifications may be made by those skilled in the art without actually departing from the spirit and scope of the invention as defined in the appended claims.

I claim:

1. A composition comprising a blend of (a) a polyetherimide and (b) a high density polyethylene in an amount effective to raise the melt index of the polyetherimide wherein said polyetherimide is of the formula

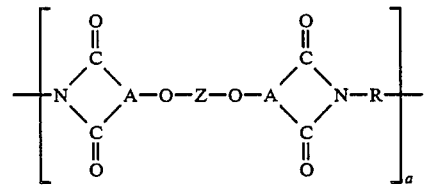

wherein a represents a whole number in excess of 1, the group —O—A< is selected from

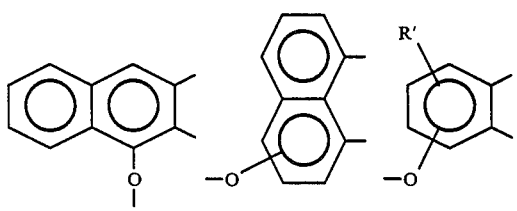

R' being hydrogen, lower alkyl or lower alkoxy, Z is a member of the class consisting of (1)

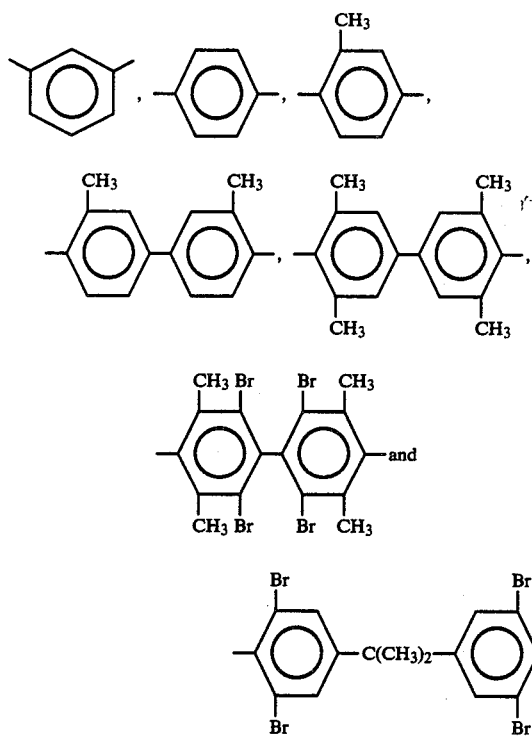

and (2) divalent organic radicals of the general formula:

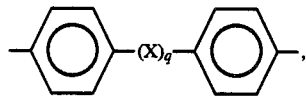

where X is a member selected from the class consisting of divalent radicals of the formulas,

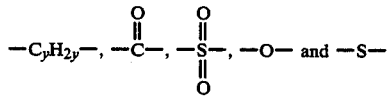

where q is 0 or 1, y is a whole number from 1 to 5, and R is a divalent organic radical selected from the class consisting of (1) aromatic hydrocarbon radicals having from 6-20 carbon atoms and halogenated derivatives thereof, (2) alkylene radicals and cycloalkylene radicals having from 2-20 carbon atoms, $C_{(2-8)}$ alkylene terminated polydiorganosiloxane, and (3) divalent radicals included by the formula

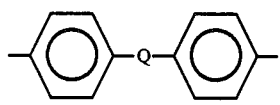

where Q is a member selected from the class consisting of

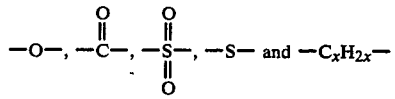

where x is a whole number from 1 to 5 inclusive.

2. A composition comprising a blend of (a) from about 99.9 parts to about 97.5 parts by weight of a polyetherimide and from about 0.1 parts to about 2.5 parts by weight of polyethylene having a nominal density of about 0.95 g/cm³ or more wherein said polyetherimide is of the formula

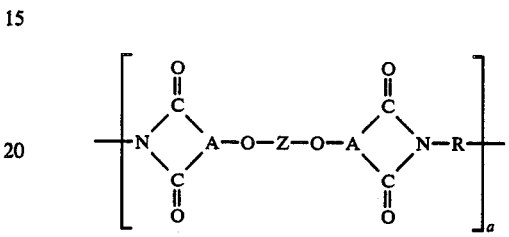

where a represents a whole number in excess of 1, the group —O—A< is selected from

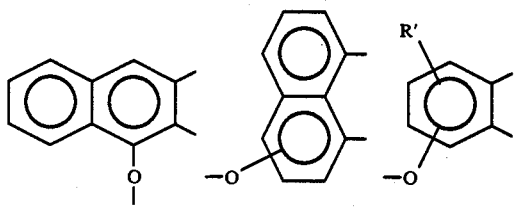

R' being hydrogen, lower alkyl or lower alkoxy, Z is a member of the class consisting of (1)

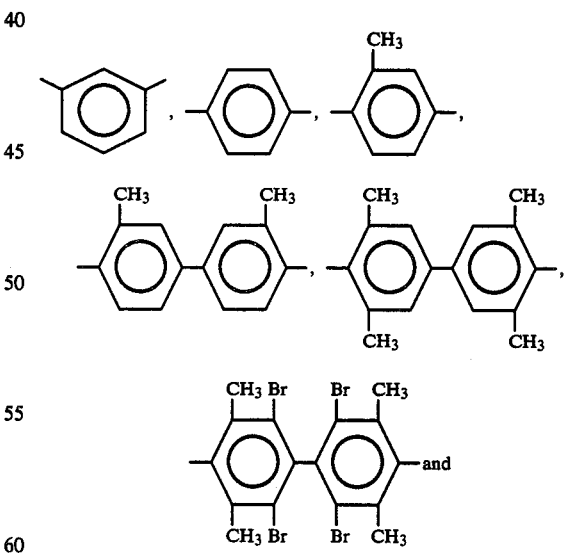

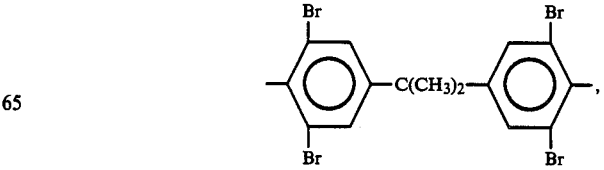

and (2) divalent organic radicals of the general formula:

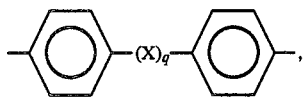

where X is a member selected from the class consisting of divalent radicals of the formulas,

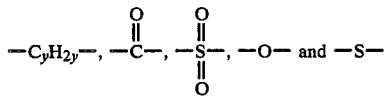

where q is 0 or 1, y is a whole number from 1 to 5, and R is a divalent organic radical selected from the class consisting of (1) aromatic hydrocarbon radicals having from 6-20 carbon atoms and halogenated derivatives thereof, (2) alkylene radicals and cycloalkylene radicals having from 2-20 carbon atoms, $C_{(2-8)}$ alkylene terminated polydiorganosiloxane, and (3) divalent radicals included by the formula

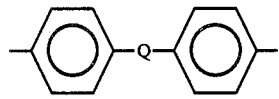

where Q is a member selected from the class consisting of

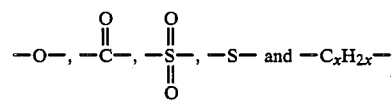

where x is a whole number from 1 to 5 inclusive.

3. A composition in accordance with claim 2 wherein the polyetherimide is of the formula:

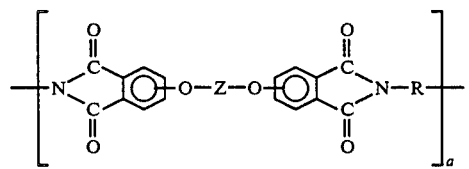

and the divalent bonds of —O—Z—O— radical are in the 3,3'; 3,4'; 4,3' or the 4,4' position.

4. A composition in accordance with claim 3 wherein Z is:

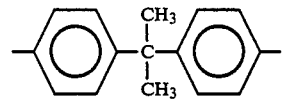

and R is selected from:

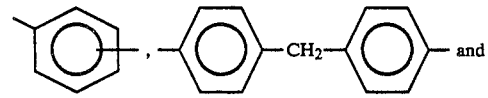

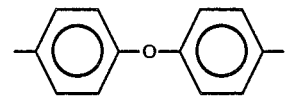

5. A composition in accordance with claim 3 wherein the polyetherimide is of the formula:

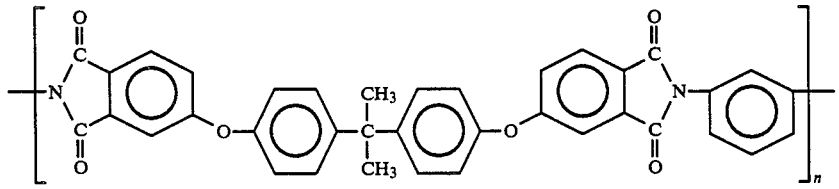

6. A composition in accordance with claim 2 wherein said polyethylene has a weight average molecular weight greater than about 300,000.

7. A composition in accordance with claim 5 wherein said polyethylene has a weight average molecular weight from about 300,000 to 500,000.

8. A composition in accordance with claim 5 wherein said polyethylene has a molecular weight of from about 3 million to 6 million.

9. A composition in accordance with claim 1 wherein said polyethylene is from about 10 to about 15 weight percent of the total composition.

* * * * *